Patented Aug. 13, 1929.

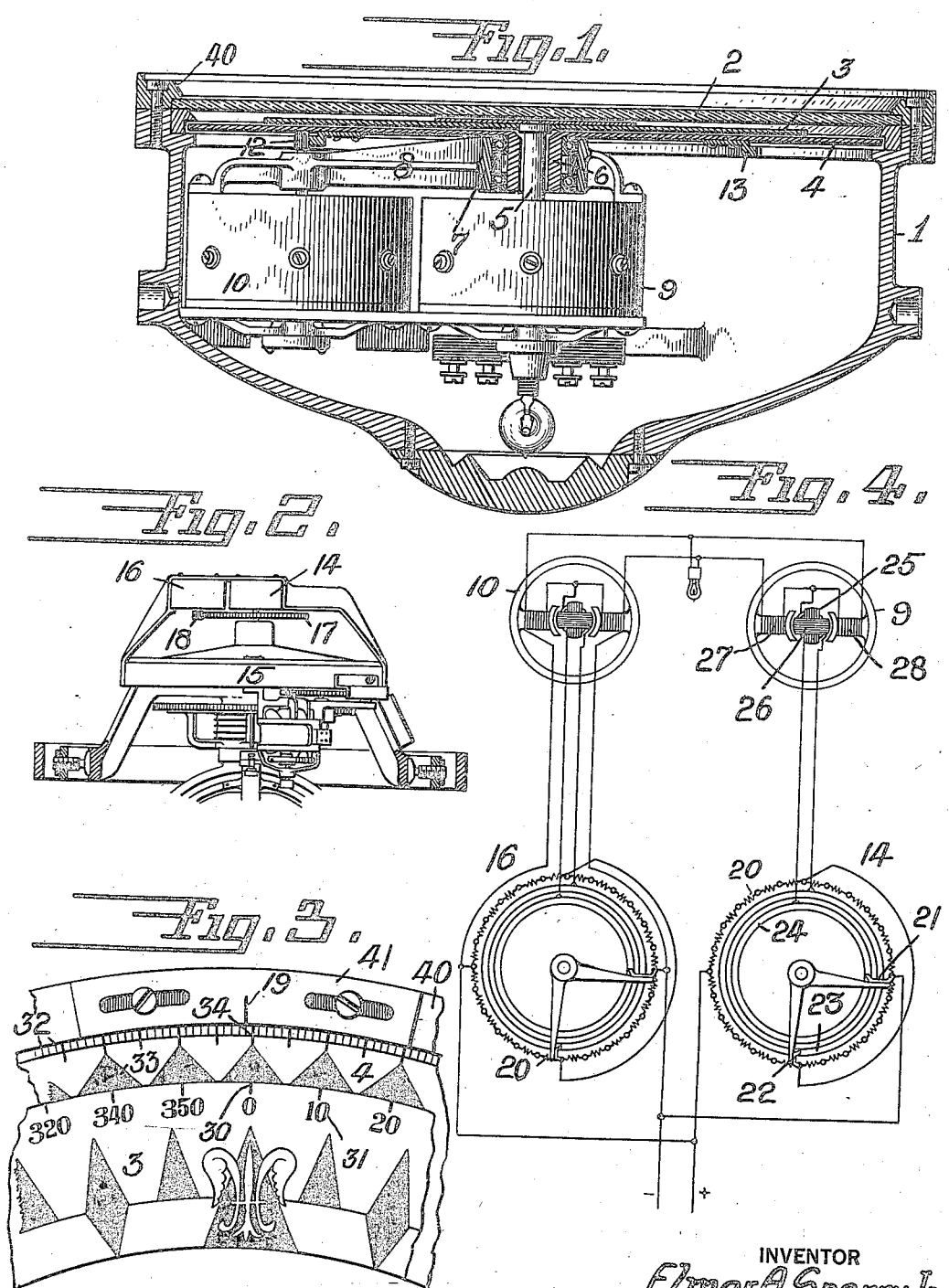

1,724,432

UNITED STATES PATENT OFFICE.

ELMER A. SPERRY, JR., OF BROOKLYN, NEW YORK, ASSIGNOR, BY MESNE ASSIGN-
MENTS, TO SPERRY GYROSCOPE COMPANY INC., OF BROOKLYN, NEW YORK, A COR-
PORATION OF NEW YORK.

REPEATER COMPASS.

Application filed December 17, 1925. Serial No. 75,930.

This invention relates to repeating instruments adapted to reproduce at a distance the indications of a master instrument. More especially it relates to repeater compasses such as are placed at various points about a ship and are controlled from a master compass. The chief difficulty with such compasses as at present constructed is that they are either not self-synchronous or if made self synchronous are insufficiently accurate for reading of less than one degree. Accuracy in repeater compasses is usually secured by driving the transmitter at a large gear ratio from the compass and driving the repeater dial by a corresponding large step down gearing from the repeater motor. It will readily be seen, however, that with such an arrangement there is no fully automatic way of getting the dial back into synchronism with the compass if the repeater motor gets a revolution or more out of step with the transmitter.

I am aware that attempts have been made to make repeater compasses more accurate by employing a secondary or auxiliary dial or indicator geared to rotate many times for one complete turn of the master compass, but such devices cannot be used for all purposes as compasses, for the dial obviously does not turn through the same angle as the compass but a multiple of that angle so that some of the principal uses for repeater compasses for taking bearings and sun azimuths are lost.

The purpose of this invention is to devise a repeater compass which is self-synchronous, which is highly accurate within a small fraction of degree, and yet which can be used to take bearings and for all other purposes for which a master compass may be employed.

Referring to the drawings in which is illustrated one form that my invention may assume, Fig. 1 is a vertical section through a repeater compass made according to my invention.

Fig. 2 is a diagrammatic view on a smaller scale of the top portion of a master compass showing the transmitters in place for driving my repeater compasses.

Fig. 3 is a plan view of a portion of the face of my repeater compass, showing the multiple dial arrangement.

Fig. 4 is a wiring diagram, showing one type of transmitter and repeater motor which may be used in my repeater compass.

The general form of my compass outwardly is very similar to the standard repeater compass and is shown as comprising a casing 1 having the usual glass cover 2. Within the casing are rotatably mounted two concentric dials 3 and 4, the first of which is shown as mounted on the inner spindle 5, while the second is secured to the outer hollow spindle 6 journaled in the central boss 7 of the main frame 8. Said dials are driven independently by separate repeater motors. As shown the spindle 5 of the dial 3 is directly connected and in fact may form an extension of the shaft of the repeater motor 9 so that the dial and motor revolve together at the same speed, the motor preferably making just one revolution for one complete turn of the ship.

The dial 4 is shown as geared by reduction gearing to its repeater motor 10. As shown the shaft 11 of the repeater 10 is provided with a pinion 12 meshing with a gear 13 secured to the under surface of the dial 4. The repeater motor 10, therefore, makes a large number of revolutions for each turn of the dial 4, say for instance, 36 revolutions, so that one revolution of the motor 10 will rotate the dial 4 through ten degrees of arc.

The dial 4, however, is not driven at any greater speed than the dial 3 has been heretofore proposed, but on the other hand is driven at the same speed. This is accomplished by connecting the repeater motor 9 to a transmitter 14 directly connected to the master compass 15 so that it makes one, and only one, complete revolution for one complete turn of the ship. On the other hand, repeater motor 10 is in circuit with a transmitter 16 which is geared to the compass through step-up gearing, comprising, for instance, a large gear 17 on the master compass and pinion 18 on the shaft of the transmitter, the ratio between the pinion 18 and gear 17 being the same as between pinion 12 and gear 13 (say 36 to 1). The dial 3 is preferably divided into comparatively large units, say 10 degree divisions by markings 30, and is also provided with numbers 31 in tens of degrees or other form of direction indications. The dial 4 is preferably without direction indications and is graduated at 32 in much finer units, say degrees or fractions thereof or minutes. Being without numbers, it is, therefore, quite immaterial whether this dial maintains the same azimuth as the master compass or not, as long as the motor 10 connected thereto maintains its armature in the proper relation to its transmitter. In other words, the dial is self synchronous within 10°, which is all that is necessary. Said dial 4 is also provided with coarse auxiliary or inclusive markings 33 in the shape of isosceles or equi-lateral triangles having their base at the periphery of the dial 3 so as to be readable in connection with the graduations 31 on the latter dial and terminating at their apices at the ten degree marks 34. Said triangles are definitely spaced at the bases from each other, a distance of say 2°. Outside of both dials is placed the usual lubber line 19 by which the compass is read. This may be on the bezel ring 40 or on an adjustable plate 41 mounted thereon.

Fig. 4 shows diagrammatically one electrical repeater system that may be employed, being similar in principle to the potentiometer system disclosed in the patent to Elmer A. Sperry #1,242,065 dated October 2, 1917 for ships gyroscopic compass set. As such systems are well understood no detailed explanation of the theory of operation is necessary. The transmitters 14 and 16 are shown as comprising a circular resistance element 20, over which pass a pair of contactors or arms 21 and 22, one of which contacts with the ring 23, the other with the ring 24. Both the field and armature of the motor are wound, the armature having a pair of coils 25—26 placed at right angles to one another between the two pole pieces 27 and 28 of the field, the arrangement being such that the two coils tend to set themselves parallel with the arms 21 and 22 of the transmitter. It will be understood, of course, that a soft iron core is preferably provided for the armature windings.

Supposing now that the maximum error of motor 9 were three or four degrees, or in other words, that it was capable of at least 90 complete and distinct steps per revolution, it will be seen that if dependence is placed alone on the dial 3 an error may be present in the readings of as high as plus or minus 4°. (The figures are illustrative only as much greater accuracy is possible.) If motor 10 were of the same type, the error in dial 4 would be only ±4/36 of a degree or ±6-2/3 minutes. On the other hand, dial 3 cannot get out of step with the master compass, or in other words cannot exceed this error, on account of the one-to-one drive from the master compass. I, therefore, provide the inclusive markings 33 on the dial 4 indicating the limits of error on each side of the correct position. In reading the compass, therefore, the observer uses the figures 31 on the dial 3 to indicate the degree digits while he employs the fine graduations on the dial 4 to give him the exact number of degrees, the triangles indicating at a glance to the observer on which digit the markings are to be read. Thus, as shown in Fig. 3 the observer notes that the figure 0 (i. e. 360) is the one that is covered by the base of the triangle when nearest the lubber line 19. On the scale 32, however, the lubber line lies one division to the left of mark 34. Therefore, the reading of the compass is 1° less than 360°, or 359°. To the observer, the two dials appear as one, so that he reads the compass just as he would a single dial compass, with a single glance and without any calculation or double observation, the true azimuth being given by the graduation 32 as read in connection with the numbers 31.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A repeater compass having two jointly readable concentrically mounted cards, one of which is finely graduated and the other provided with quantitative direction indications on which the graduations of the first-named card are read, a repeater motor for each card, the first mentioned card being connected to its motor through reduction gearing and said second mentioned card having a one-to-one connection with its motor.

2. In a repeater compass system, a main dial having comparatively coarse graduations, a repeater motor directly connected thereto, an auxiliary dial having finer graduations, and a repeater motor geared thereto, to rotate many times for one revolution of the dial, a transmitter for said first-named repeater motor connected to the compass so as to rotate said motor at the same rate as the ship turns, and a second transmitter geared to the compass so as to rotate the second-named repeater motor the same number of times per turn of the ship as the said motor rotates per revolution of its dial whereby both of said dials turn together at the same rate.

3. In a self-synchronous repeater instrument, a rotatable indicator having graduations and reference numerals thereon, a second concentric rotatable indicator having finer graduations than said first indicator and so placed that the numerals on the first indicator are read in connection with the graduations on the second indicator both of said indicators normally rotating together at the same rate.

4. In a repeater compass, the combination with the master compass, of a rotatable, graduated repeater card without other direction indications, a repeater motor geared thereto so as to revolve a plurality of times per revolution of the card, means other than said card providing the direction indications to be read in conjunction with said graduated card, and a transmitter for driving said motor geared to rotate the same number of times per revolution of the compass as said repeater motor rotates per revolution of the card, whereby said card is rotated in synchronism with the compass.

5. In a repeater system, the combination with a sending instrument having a rotatable card and coarse and fine transmitters, a self-synchronous repeater dial, a repeater motor adapted to be driven from said coarse transmitter and connected to said dial, said dial having degree numerals and markings thereon no finer than the limits of accuracy thereof, a second non-self-synchronous but more accurate repeater dial, a second repeater motor adapted to be driven from said fine transmitter and connected to said second dial through reduction gearing, said second dial having fine graduations thereon adapted to be read with the numerals on the first-named dial, whereby both dials rotate in unison with the sending instrument card.

6. In a repeater system, the combination with a sending instrument having a rotatable card and coarse and fine transmitters, a self-synchronous repeater dial, a repeater motor adapted to be driven from said coarse transmitter and connected to said dial, said dial having degree numerals and markings thereon no finer than the limits of accuracy thereof, a second non-self-synchronous but more accurate repeater dial, a second repeater motor adapted to be driven from said fine transmitter and connected to said second dial through reduction gearing, said second dial having fine graduations thereon and also inclusive markings for indicating which numeral on the first dial to read in connection with the second dial, whereby both dials rotate in unison with the sending instrument card.

In testimony whereof I have affixed my signature.

ELMER A. SPERRY, Jr.